United States Patent [19]

Armstrong et al.

[11] 3,956,753

[45] May 11, 1976

[54] DATA COLLECTING SYSTEM

[75] Inventors: Albert L. Armstrong, Latham; Paul E. Bakeman, Jr., Elnora, both of N.Y.; Joel Woodhull, Los Angeles, Calif.; Wayne C. Taft, Troy, N.Y.; H. Norman Ketola, Stowe, Vt.

[73] Assignee: RRC International, Inc., Latham, N.Y.

[22] Filed: Feb. 20, 1975

[21] Appl. No.: 551,423

Related U.S. Application Data

[63] Continuation of Ser. No. 410,971, Oct. 29, 1973, abandoned.

[52] U.S. Cl. ................................ 346/34; 340/149 A

[51] Int. Cl.[2] ........................................... G01D 9/00

[58] Field of Search .................... 346/34; 340/149 A

[56] References Cited

UNITED STATES PATENTS

| | | | |
|---|---|---|---|
| 2,918,654 | 12/1959 | Hillyer | 346/34 |
| 3,866,173 | 2/1975 | Moorman | 340/149 A |

*Primary Examiner*—Thomas B. Habecker

[57] ABSTRACT

A data collecting system is provided to produce a record of data relating to sequential occurrences for subsequent and/or remote processing. The system includes clock means for generating a time or service representative signal, at least one means adapted to generate a signal in response to an external random input, and scanning means adapted to sequentially scan the generating means and interconnect the generating means and clock with a recording medium if a random input signal is detected.

3 Claims, 7 Drawing Figures

DATA COLLECTING SYSTEM

This is a continuation of application Ser. No. 410,971, filed Oct. 29, 1973, and now abandoned.

BACKGROUND OF THE INVENTION

The present invention, in its broadest aspect, relates to a data gathering system and more particularly to a system for producing a sequential recording of occurrences for subsequent and/or remote processing. The invention provides significant upgrading in the ability to obtain, process, and record data which accurately portrays the type and amount of a rendered service. The billing for such services can therefore be more fairly and accurately related to the actual service provided. In addition the range of service types or qualities and the forms of payment possible are quite flexible and can all be handled as a group and in an efficient manner. Representative of the types of services which can benefit from the present invention are educational services — ex. attendance records, health services — ex. nurse and drug records, transportation services — ex. delivery of people and parcels.

In a particular embodiment, which is used here for illustration, the system is utilized as part of an automated fare collecting system for a public transportation facility which provides for varying scale of fares directly related to the services rendered the passenger charged. From its beginnings, public transportation in the United States was financed by a flat fare system. Initially this was acceptable because the fare was low and riders had few alternatives except walking. Over the years, as costs increased, fares were raised to produce additional revenue; however the ridership dropped off on a long term basis. The embodiment of the invention described provides the alternative to present transit systems of charging passengers a fee directly related to the services rendered.

The present invention relates to a data collecting system which renders a value received system of fares feasible by removing the point of the business transaction (such as between a passenger on a bus, train, trolley, etc. and the carrier) from the remote location to a central office (computer location). The proposed system contemplates a use of two primary elements: a data collecting unit which can readily be carried on a bus or otherwise existing at a remote location and a computer with appropriate software to transform the data accumulated by the collector into periodic billings which can then be sent to the service recipient (ex passenger). The system further contemplates that in place of the coins which are now commonly used, the customer will carry a suitably encoded card bearing information relating to the customer and necessary billing information.

As stated, the present system enables charges to a customer to be related directly to the services rendered and thus enables the business facility to offer a wider range of services than was heretofore possible such as for example, door-to-door service, group rates, and subsidized fares.

Thus, it is the principal object of the present invention to provide a unit for collecting data for use in generating and preparing bills for services rendered and information pertinent to the auditing and managing of these services.

A further object of the invention is to provide such a unit which utilizes conventional components which are readily available and relatively inexpensive to compile so as to render the overall system economically feasible on a commercial scale.

SUMMARY OF THE INVENTION

The above and other beneficial objects and advantages are attained in accordance with the present invention by providing a data collecting system to produce a record of data relating to sequential occurrences for subsequent and/or remote processing. The system includes clock means or other means (i.e., an odometer) for specifying the services rendered for generating a time representative output signal, at least one other means adapted to generate an output signal in response to an external excitation source, recording means and scanning means. The scanning means sequentially scans each of the signal generating means and for each scan wherein an output signal is detected, the scanning means interconnects both the clock and signal generating means to the recorder so as to produce a time or distance based record. Removable record recording means as used herein shall be interpreted to mean any recording means wherein the information or data recorded must be transmitted to a remote location for processing.

DETAILED DESCRIPTION OF THE PREFERRED EMBODIMENT

Reference is now made to the drawings wherein the present system is illustrated. As stated, it is contemplated that the present system be comprised of hardware components generally available. Accordingly, the present description will concern itself with the overall system concept. The specifics of each component of the system are illustrated in detail in the accompanying drawings but will not be described in detail in the present description.

Figure 1:
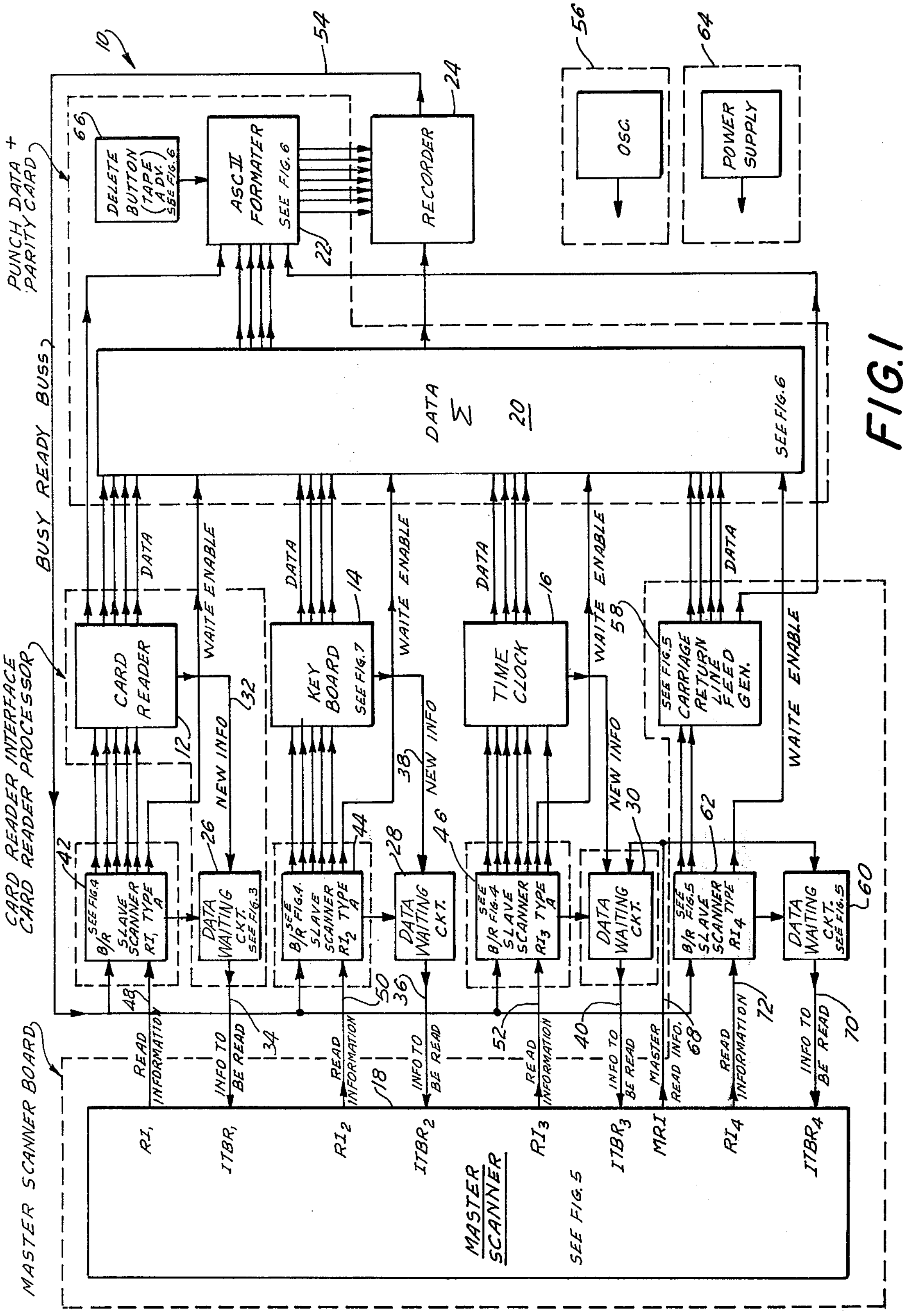
FIG. 1 is a block diagram of the system of the present invention.

Referring to FIG. 1, there is illustrated in block diagram form a data collecting unit 10 which it is contemplated will be carried by each vehicle of a transit system to record the details of the various transactions that occur on the vehicle and produce a record for subsequent processing by a computer. Accordingly, the collector 10 is shown as comprising a card reader 12, key-board 14, and clock 16 each adapted to generate an output signal which can be detected by a master scanner 18 and transmitted to a data bank 20. As previously stated, an odometer or the like, may be substituted for the clock to generate a signal representative of the services rendered. For purposes of the present description such analogous devices may also be considered as clocks. Data bank 20, in turn, feeds the information into a formatter 22 which processes the information by converting it to a format compatible with an associated computer. This information is then fed to an incremental recorder 24 which may be a mechanical or electrical device. The recorder makes the record that comprises the input to the computer. The recorder is of the incremental type so it is only operative when data is presented to it.

Figure 2:
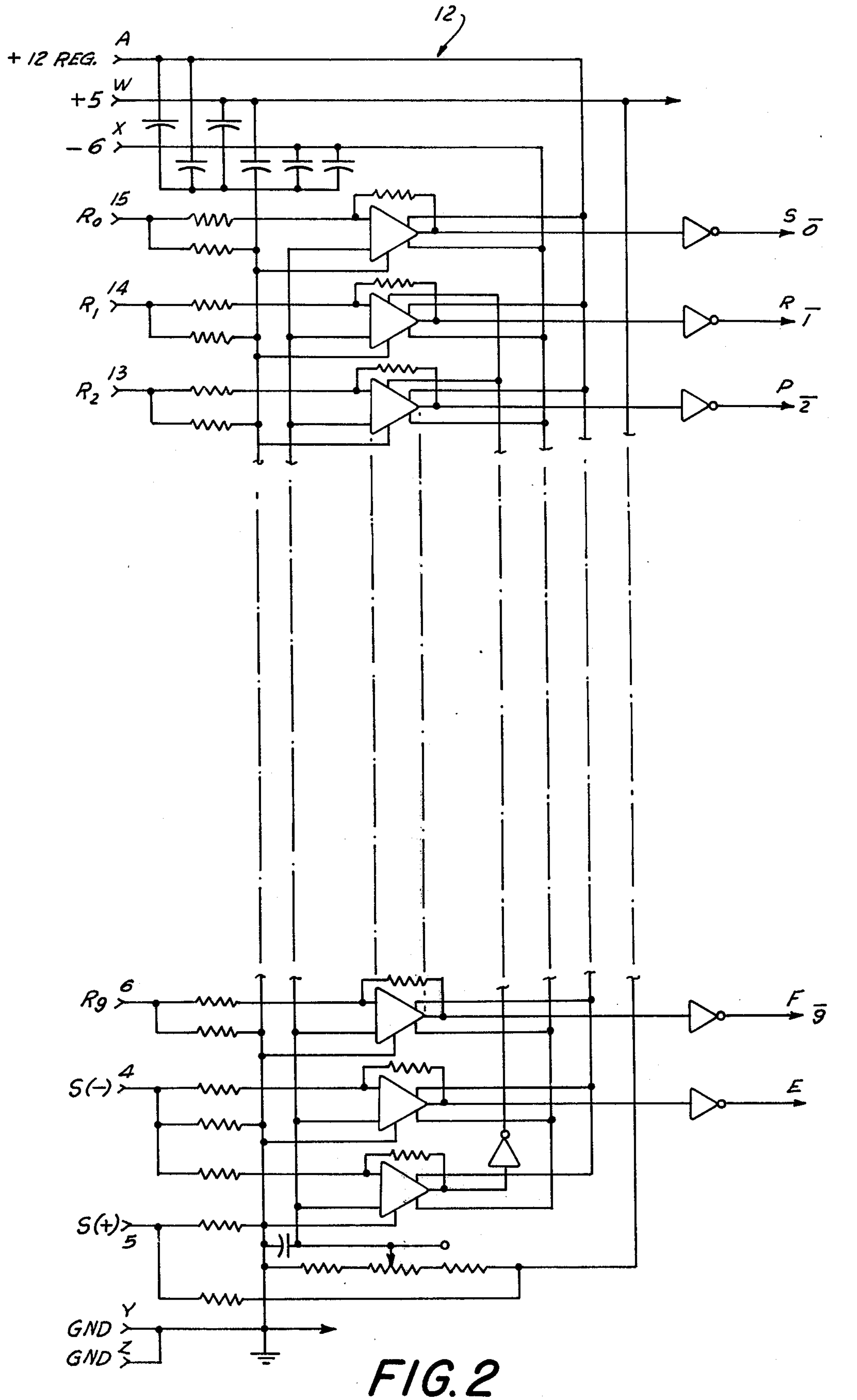
FIGS. 2 through 7 are schematic diagrams of the various components of the present system.
Figure 3:
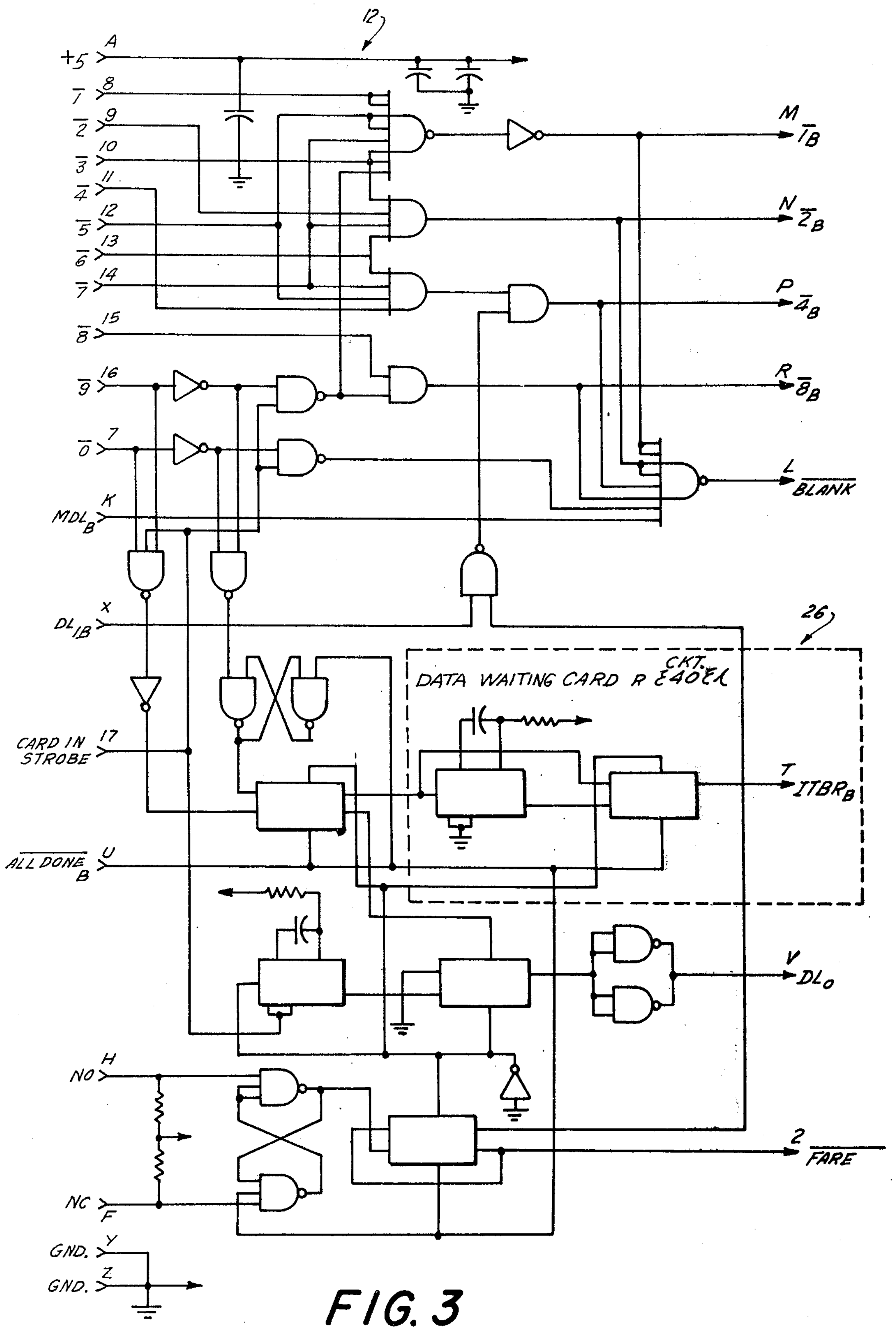

The card reader 12 is illustrated in detail in FIGS. 2 and 3 and comprises a conventional piece of hardward adapted to decode information encoded on a card carried by a passenger and inserted into a suitable slot or other receptacle on the vehicle. The card reader serves to generate an electrical signal representative of the information carried on the card. This may be considered as a random input because there is no way of determining in advance which card will be inserted. The choice of card reader must, obviously, be related to the type of card carried by the passenger and must be compatible therewith. Also, the card reader is used to generate digital signals indicating the status of the card (i.e., is the card in the card reader properly, has reading been completed, has the card been removed before reading has been completed, and has the card been removed completely so that the next card is ready for insertion). The circuit of FIG. 2 contains a set of amplifiers to amplify the signals available at this card reader to a level compatible with the remainder of the system. FIG. 3 represents the protocol logic.

Figure 7:
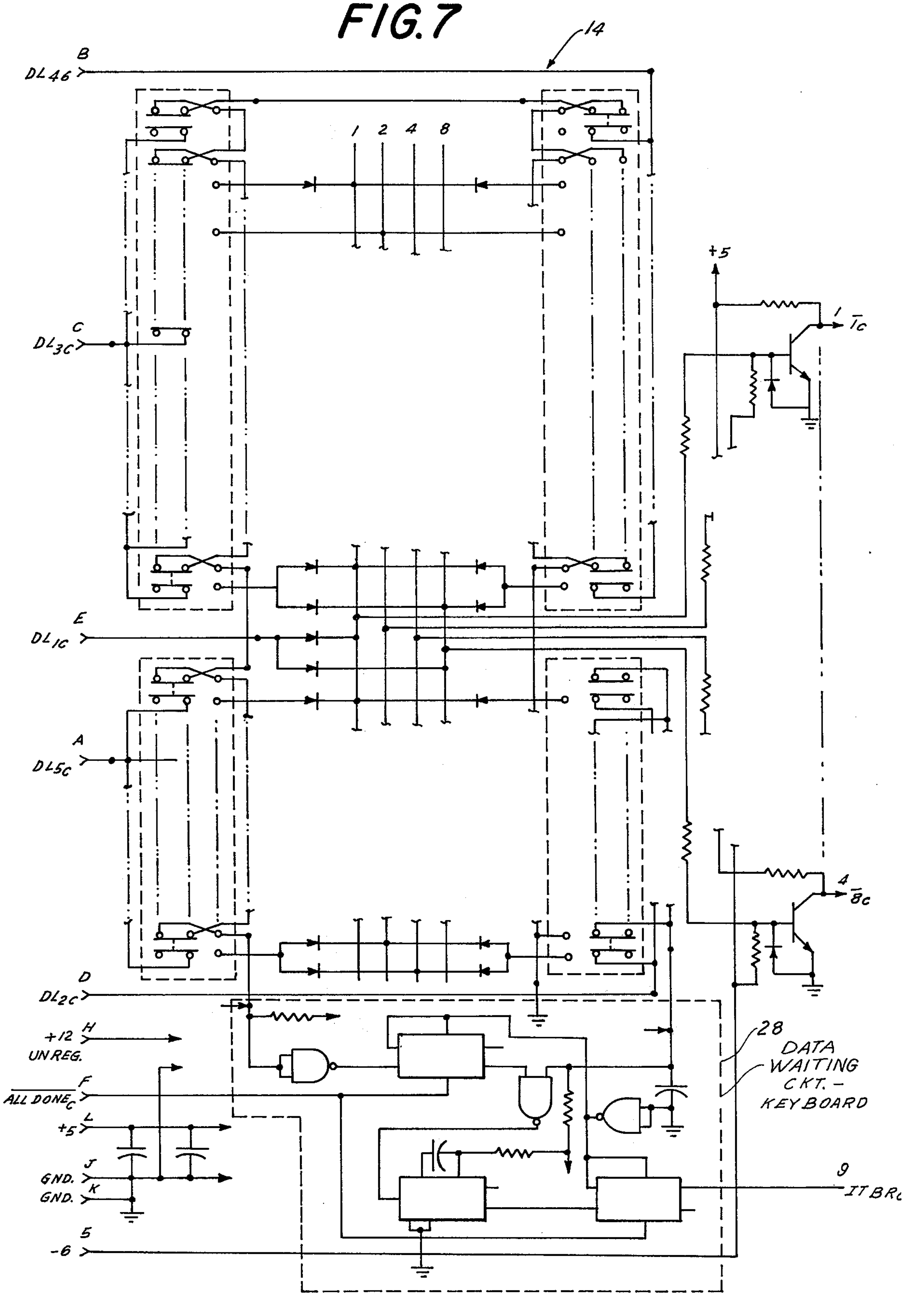

The keyboard 14 is illustrated in detail in FIG. 7 and once again comprises a conventional hardware component which is mounted in the vehicle readily accessible to the driver. The keyboard contains a series of keys which, when depressed, generate signals representative of the key depressed which could for example, indicate the zone at which a passenger was picked up or discharged, the type of service rendered (i.e., whether the passenger was picked up along the normal route or if the driver deviated from the route such as for door-to-door service) etc. Again, the keyboard input may be considered as a random input becuase there is no way of determining in advance which key or combination of keys will be depressed and when.

The card reader 12, keyboard 14, and clock 16 each has, in addition to a data output, an output line 32, 38, and 42 respectively which is indicative of new data generated by the card reader, keyboard or clock i.e., a card has been inserted, a key depressed, or the clock has changed by one minute. Since these change signals may be of a transient nature, information data waiting circuit 26, 28 and 30 are provided which are latches for the signals on lines 32, 38 and 42. The outputs of these data waiting circuits 34, 36 and 40 indicate the presence of a new signal to the master scanner.

Accordingly, when the card reader 12 is activated, circuit 26 receives indication of this along line 32 and in turn generates a signal along line 34 for the master scanner. Circuit 26 is depicted in detail in FIG. 3. A Type D flip flop is employed as the latch. Similarly, circuit 28 generates a signal on line 36 when it receives an input on line 38 that the keyboard has been actuated. Circuit 28 is depicted in detail in FIG. 7.

Figure 5:
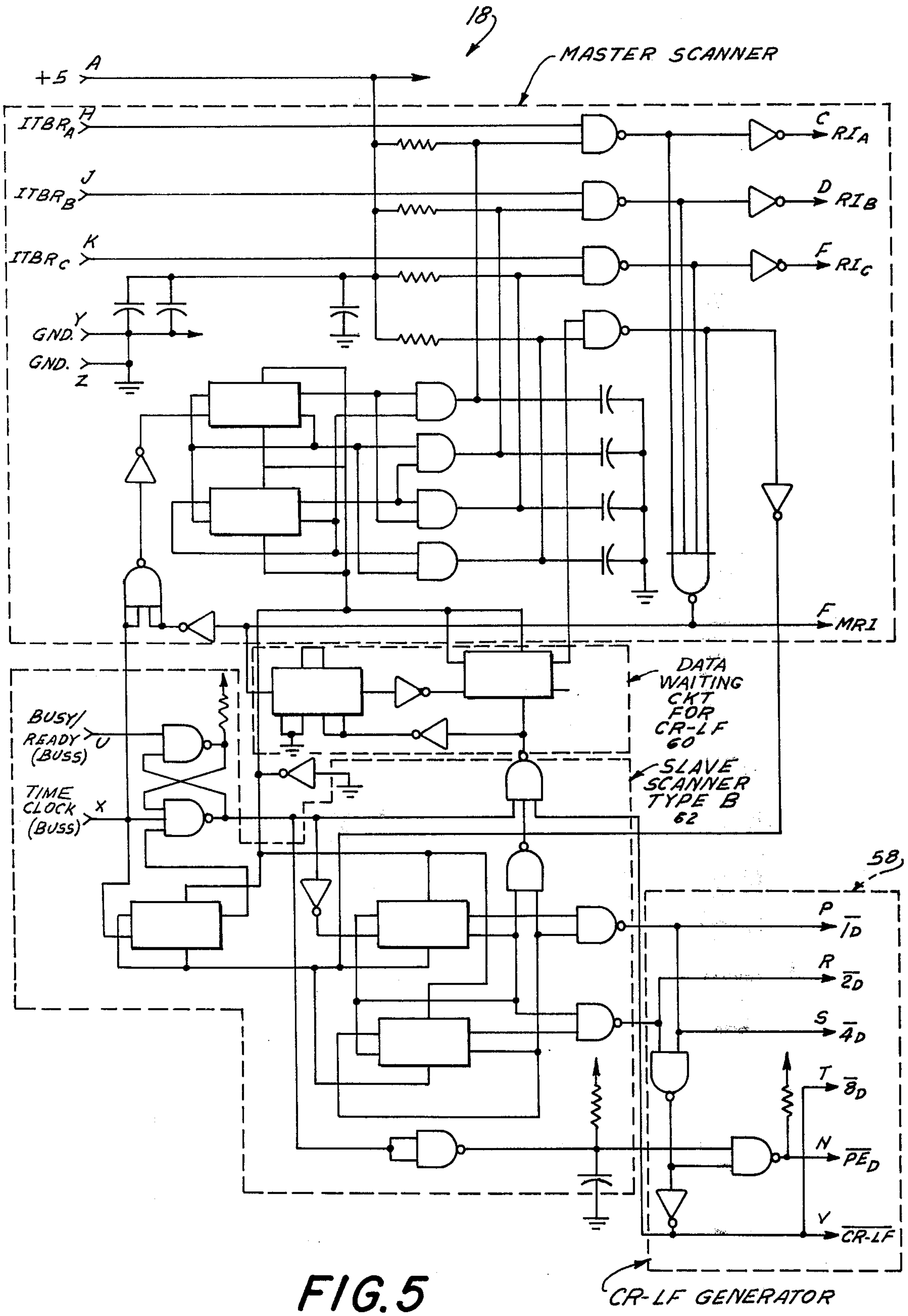
Figure 6:
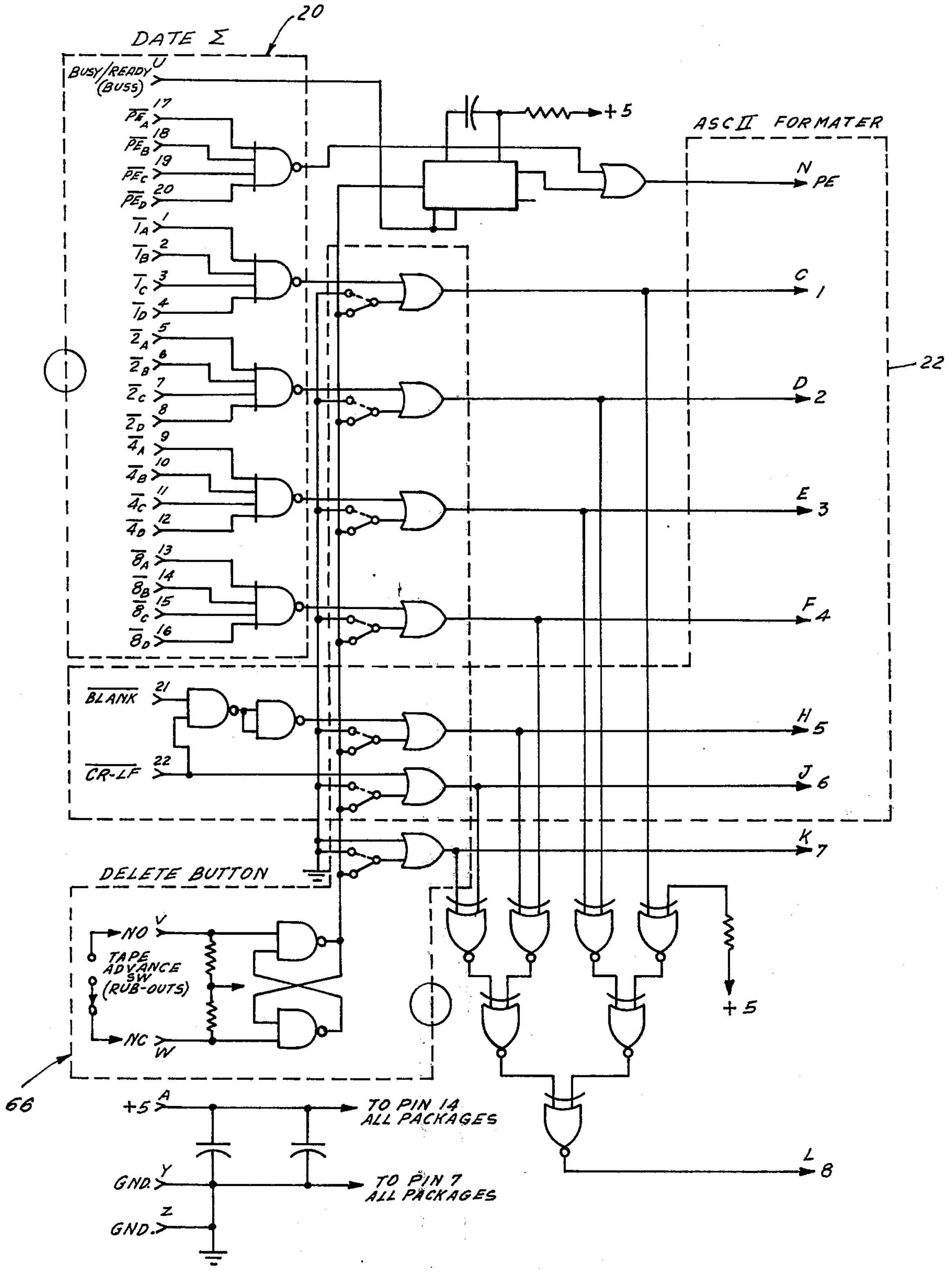

The clock change signal on line 42 is ANDED with the Master Read Information line 68 from the master scanner which is active when any single Read Information line is active. Thus, circuit 30 generates a signal on line 40 that information is available to be read whenever clock 16 advances and another information source has been read. The outputs on lines 34, 36 and 40 of circuits 26, 28 and 30 respectively are fed to the master scanner 18 indicating to the master scanner that there is information to be read from the card reader, keyboard or clock. The master scanner 18, depicted in FIG. 5 is a ring counter driven by oscillator 56 to scan each of the circuits 26, 28 and 30 to determine if there is information available to be read. If so, the master scanner stops counting and generates a "READ INFORMATION" signal to an associated slave scanner which then strobes the available information from the particular data source.

Figure 4:
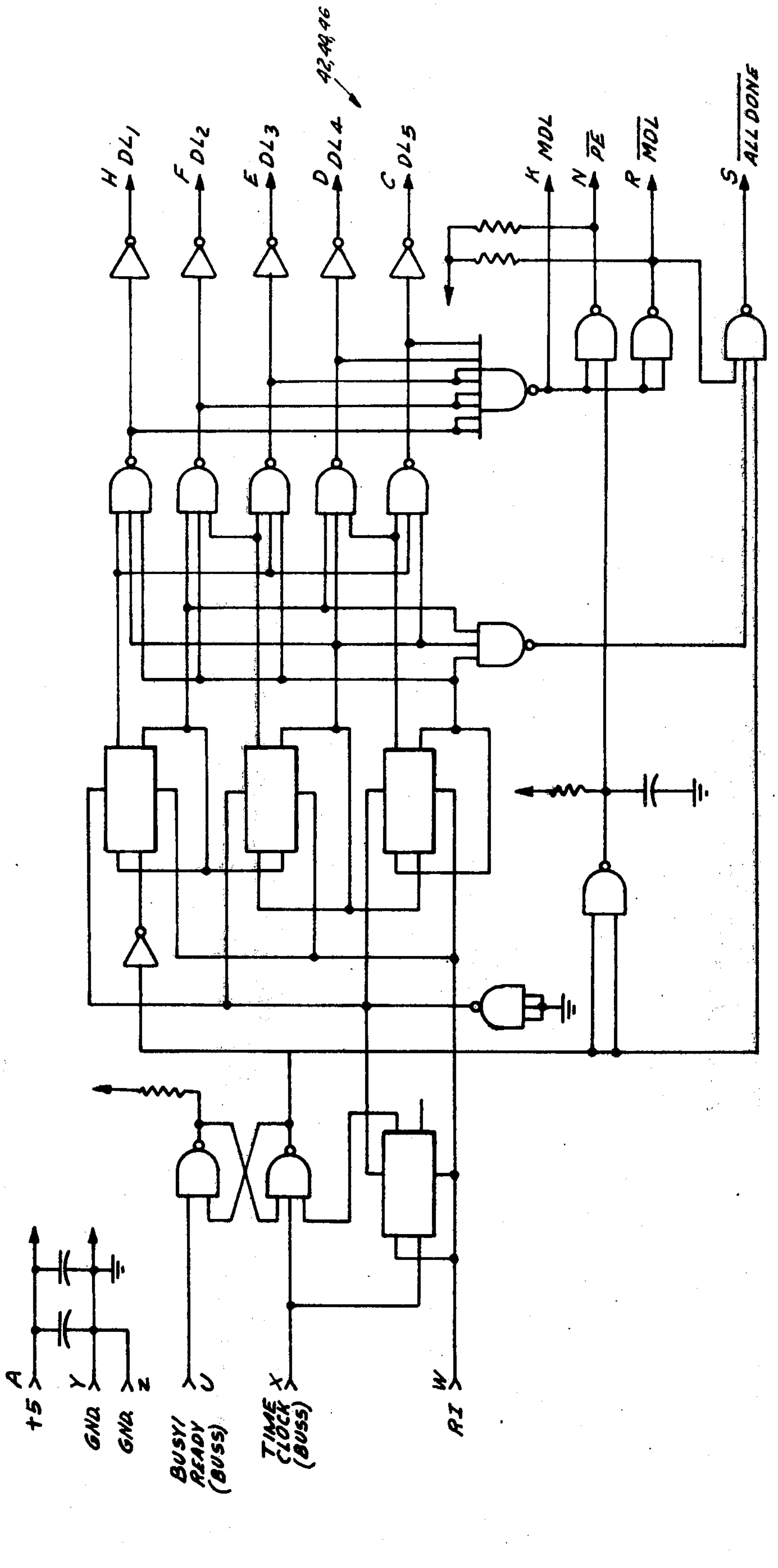

Accordingly, slave scanner 42 is provided for card reader 12. Similarly, slave scanner 44 is provided for keyboard 14 and slave scanner 46 is provided for clock 16. The details of the slave scanners are depicted in FIG. 4.

The slave scanner comprises a ring counter with decoded outputs to provide sequential strobe outputs, one for each character to be read from a data source. The counter is advanced by a signal from oscillator 56, however, the oscillator signal is ANDED with an output signal 54 of recorder 24 indicative that the recorder is able to receive information. If the recorder is not able to receive information at that time, the slave scanners must hold the count until the recorder is ready to receive. Suffice it to say, each scanner is triggered by a READ INFORMATION signal generated by the master scanner along lines 43, 50 and 52 for the card reader, keyboard and clock scanners respectively. The READ INFORMATION signal, in turn, is produced by the master scanner when the master scanner receives a signal from circuits 26, 28 or 30 that there is information to be read. The master scanner serves to insure that only one slave scanner is operatively connected to the recorder at any time.

In order to format the recorded information for proper acceptance by typical computer machinery, the coded characters "carriage return" and "line feed" must be inserted in the data stream at discrete intervals. For this function, a carriage return line feed generator 58 is provided. Generator 58 has an associated data waiting circuit 60, and slave scanner 62, the details of which, along with those of the generator 58 are depicted in FIG. 5. The flag circuit 60, comprises a counter and latch advanced by signals on the Master Read Information line 68. The counter thus counts the number of blocks of information recorded. After a prescribed count is reached, an Information to be Read signal appears at the output of the flag circuit on line 70 to the Master Scanner. When the master scanner senses this signal, it stops scanning and activates the Read Information line 72 to slave scanner 62. This slave scanner is similar to the type previously described however, only two output strobe lines are needed. These strobe lines cause the carriage return line feed generator 58 to provide to the data bank 20, formatter 22, and recorder 29 the properly coded signals for the carriage return and line feed characerts sequentially. The system further includes a power supply 64 providing the power for the entire unit and a delete button 66 which in effect is a tape advance for the recorder.

In operation, a passenger upon entering the bus or other vehicle inserts a pre-encoded card into the card reader 12. The presence of the card would cause a signal to circuit 26 which, in turn, would generate a signal to the master scanner which would then trigger the slave scanner 42 to transmit the information from the card to the data bank. During the same sweep, the master scanner would also trigger slave scanner 46 to transmit information from clock 16 to the data bank as to the time of the occurrence of the transaction if this has changed since the last transaction. The bus driver, through keyboard 14, would indicate the type of service being offered to a passenger and possible other information indicative of the place where the transaction took place if this has changed since the last transaction. This information would similarly be fed to the data bank. When the rider departs from the bus, the process is repeated. Accordingly, in some installations, it may be desirable to provide an additional card reader for the rear of the bus. In such a case, both card readers would feed into a common data recorder. At the end of each day, the tape produced by recorder 24 would be taken to a computer or a computer terminal station to be processed for use in preparing a bill or statement for the passenger.

While the above system was described in connection with a public transit facility, it applies equally to any other operation where it is desirable to separate information processing from the point at which the information is generated. Thus, the same system is utilized for maintaining school attendance records by providing each student with a suitably coded card and providing card readers at the school house or school room entrances. The record generated is then used to determine attendance within the school and various classes of the school for whatever purpose the records may be necessary such as for determining the amount of financial assistance a school is entitled to under the various state and federal programs based on attendance. In other applications of the data collecting system described, the data recorded may pertain not only to the rendering of a service, as in transporting a customer or package or teaching a student, but also to the completion of an act, such as the administering of a medication or the receipt of a document or the vending of a product.

Having thus described the invention, what is claimed is:

1. A data collecting system in which each entry of data activates the system to record that entry into a sequential record of occurrences for subsequent processing removed from the site of the occurrences comprising: time clock data generating means for generating a time representative first information output signal; at least one additional data generating means adapted to generate an additional information output signal in response to said entry; each of said data generating means including circuit means for producing a data waiting signal independent of said information output signals when said information output signal is generated; removable record recording means; slave scanner means and master scanning means adapted to sequentially energize said slave scanner means for each of said data generating means, said master scanning means sequentially testing each of said circuit means for the presence of said data waiting signal, and energizing said respective slave scanner means in response thereto, whereby said data entry is applied to said recording means to produce said sequential record.

2. The system in accordance with claim 1 in which each signal source generates an identifying character such that the source of each data can be easily identified.

3. The system in accordance with claim 1 wherein said additional data generating means comprises more than one card reader used with one recording means.

* * * * *